(12) United States Patent
Dixon et al.

(10) Patent No.: US 11,493,984 B1
(45) Date of Patent: *Nov. 8, 2022

(54) DATA STORAGE PERFORMANCE SCALING BASED ON EXTERNAL ENERGY

(71) Applicant: Seagate Technology LLC, Fremont, CA (US)

(72) Inventors: Robert W. Dixon, Longmont, CO (US); Steven S. Williams, Longmont, CO (US)

(73) Assignee: Seagate Technology LLC, Fremont, CA (US)

(*) Notice: Subject to any disclaimer, the term of this patent is extended or adjusted under 35 U.S.C. 154(b) by 155 days.

This patent is subject to a terminal disclaimer.

(21) Appl. No.: 16/943,240

(22) Filed: Jul. 30, 2020

Related U.S. Application Data

(63) Continuation of application No. 15/706,565, filed on Sep. 15, 2017, now Pat. No. 10,761,590.

(51) Int. Cl.
  *G06F 1/3234* (2019.01)
  *G06F 3/06* (2006.01)

(52) U.S. Cl.
  CPC .......... *G06F 1/3268* (2013.01); *G06F 1/3275* (2013.01); *G06F 3/0602* (2013.01)

(58) Field of Classification Search
  None
  See application file for complete search history.

(56) References Cited

U.S. PATENT DOCUMENTS

| | | | |
|---|---|---|---|
| 5,200,685 A | 4/1993 | Sakamoto | |
| 5,532,524 A | 7/1996 | Townsley et al. | |
| 6,295,577 B1 | 9/2001 | Anderson et al. | |
| 7,107,480 B1 | 9/2006 | Moshayedi et al. | |
| 7,269,755 B2 | 9/2007 | Moshayedi et al. | |
| 7,467,311 B2 | 12/2008 | Bahali et al. | |
| 7,546,475 B2 | 6/2009 | Mayo et al. | |
| 7,814,351 B2 | 10/2010 | Lubbers et al. | |
| 7,836,418 B2 | 11/2010 | Binder et al. | |
| 7,851,950 B1 | 12/2010 | Morales | |
| 8,301,742 B2 | 10/2012 | Hanson et al. | |
| 8,305,737 B2 | 11/2012 | Ewing et al. | |
| 8,333,316 B2 | 12/2012 | Heath et al. | |
| 8,378,530 B1 | 2/2013 | Morales | |
| 8,407,502 B1 | 3/2013 | Guy et al. | |
| 8,627,117 B2 | 1/2014 | Johnston | |

(Continued)

OTHER PUBLICATIONS

Wang, Ship: A Scalable Hierarchical Power Control Architecture for Large-Scale Data Centers—Supplementary File, TN.

(Continued)

*Primary Examiner* — Paul Yen

(74) *Attorney, Agent, or Firm* — Christian W. Best

(57) ABSTRACT

Systems and methods are disclosed for data storage performance scaling based on external energy. In certain embodiments, a system may comprise a data storage device having an interface to communicate with an external device, a nonvolatile memory, and a circuit. The circuit may be configured to receive an indication via the interface of power resources available to the data storage device from the external device in case of a power loss event, adjust a performance metric of the data storage device to apply when accessing the nonvolatile memory during normal power availability based on the indication, and perform operations during normal power availability based on the performance metric.

20 Claims, 6 Drawing Sheets

(56) References Cited

U.S. PATENT DOCUMENTS

| | | |
|---|---|---|
| 9,329,910 B2 | 5/2016 | Bohn et al. |
| 2002/0064112 A1 | 5/2002 | Seo |
| 2006/0015688 A1 | 1/2006 | Schnapp et al. |
| 2006/0053324 A1 | 3/2006 | Giat et al. |
| 2006/0082222 A1 | 4/2006 | Pincu et al. |
| 2006/0195706 A1 | 8/2006 | Burchard et al. |
| 2007/0180280 A1 | 8/2007 | Bolan et al. |
| 2008/0168283 A1 | 7/2008 | Penning |
| 2009/0164820 A1 | 6/2009 | Abraham |
| 2009/0319808 A1 | 12/2009 | Brundridge et al. |
| 2010/0162006 A1 | 6/2010 | Therien et al. |
| 2010/0226170 A1 | 9/2010 | Lin et al. |
| 2012/0209442 A1 | 8/2012 | Ree |
| 2014/0143558 A1 | 5/2014 | Kuesel et al. |
| 2016/0363970 A1 | 12/2016 | Zhou et al. |

OTHER PUBLICATIONS

Wang, Ship: Scalable Hierarchical Power Control for Large-Scale Data Centers; TN.

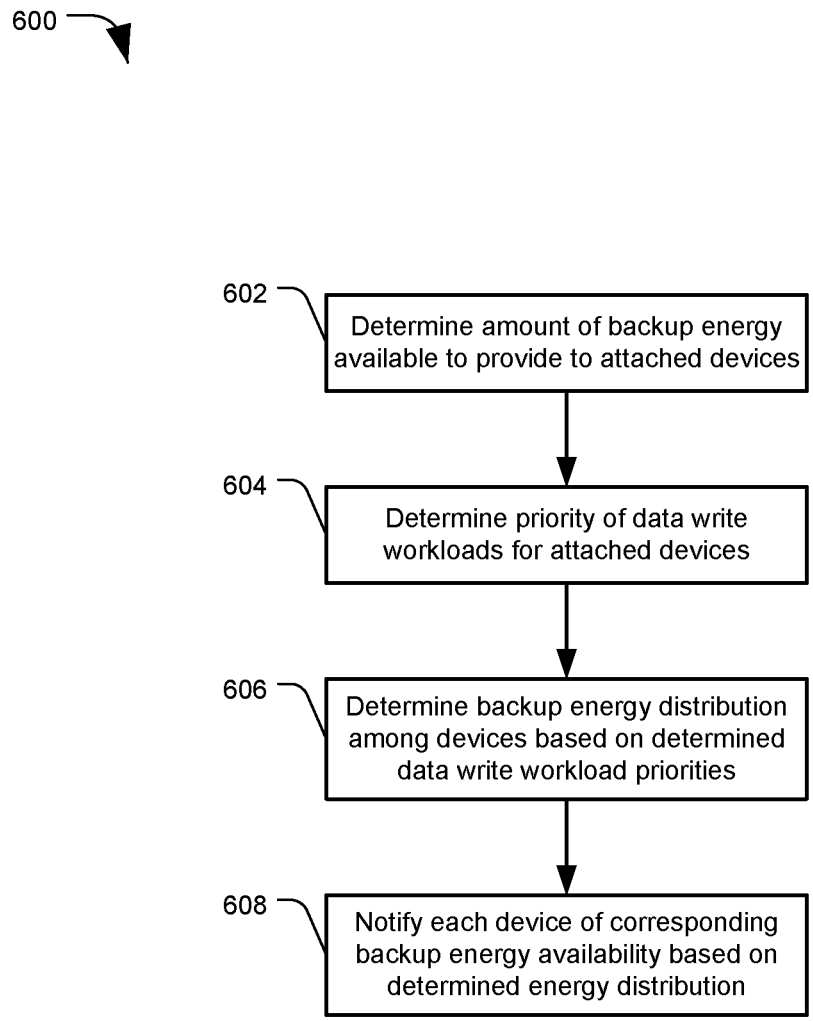

DATA STORAGE PERFORMANCE SCALING BASED ON EXTERNAL ENERGY

CROSS-REFERENCE TO RELATED APPLICATIONS

The present application is a continuation of and claims priority to pending U.S. patent application, application Ser. No. 15/706,565, filed Sep. 15, 2017, entitled "Data Storage Performance Scaling Based on External Energy", the contents of which are hereby incorporated by reference in their entirety.

SUMMARY

In certain embodiments, a system may comprise a data storage device having an interface to communicate with an external device, a nonvolatile memory, and a circuit. The circuit may be configured to receive an indication via the interface of power resources available to the data storage device from the external device in case of a power loss event, adjust a performance metric of the data storage device to apply when accessing the nonvolatile memory during normal power availability based on the indication, and perform operations during normal power availability based on the performance metric.

In certain embodiments, a method may comprise determining, at a host device, an amount of backup power available to provide to a plurality of devices connected to the host device in case of a power loss event, determining priorities of workloads provided from the host device to the plurality of devices, determining a backup power distribution among the plurality of devices based on the determined priorities of workloads, and sending an indication to at least one device from the plurality of devices, the indication identifying an amount of backup energy available to the at least one device based on the backup power distribution.

In certain embodiments, a method may comprise receiving, at a data storage device, an indication from an external device of power resources available to the data storage device from the external device in case of a power loss event, adjusting a performance metric of the data storage device to apply when accessing a nonvolatile memory during normal power availability based on the indication, and performing operations at the data storage device during normal power availability based on the performance metric.

BRIEF DESCRIPTION OF THE DRAWINGS

FIG. 6 is a flowchart of a method of data storage performance scaling based on external energy, in accordance with certain embodiments of the present disclosure.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
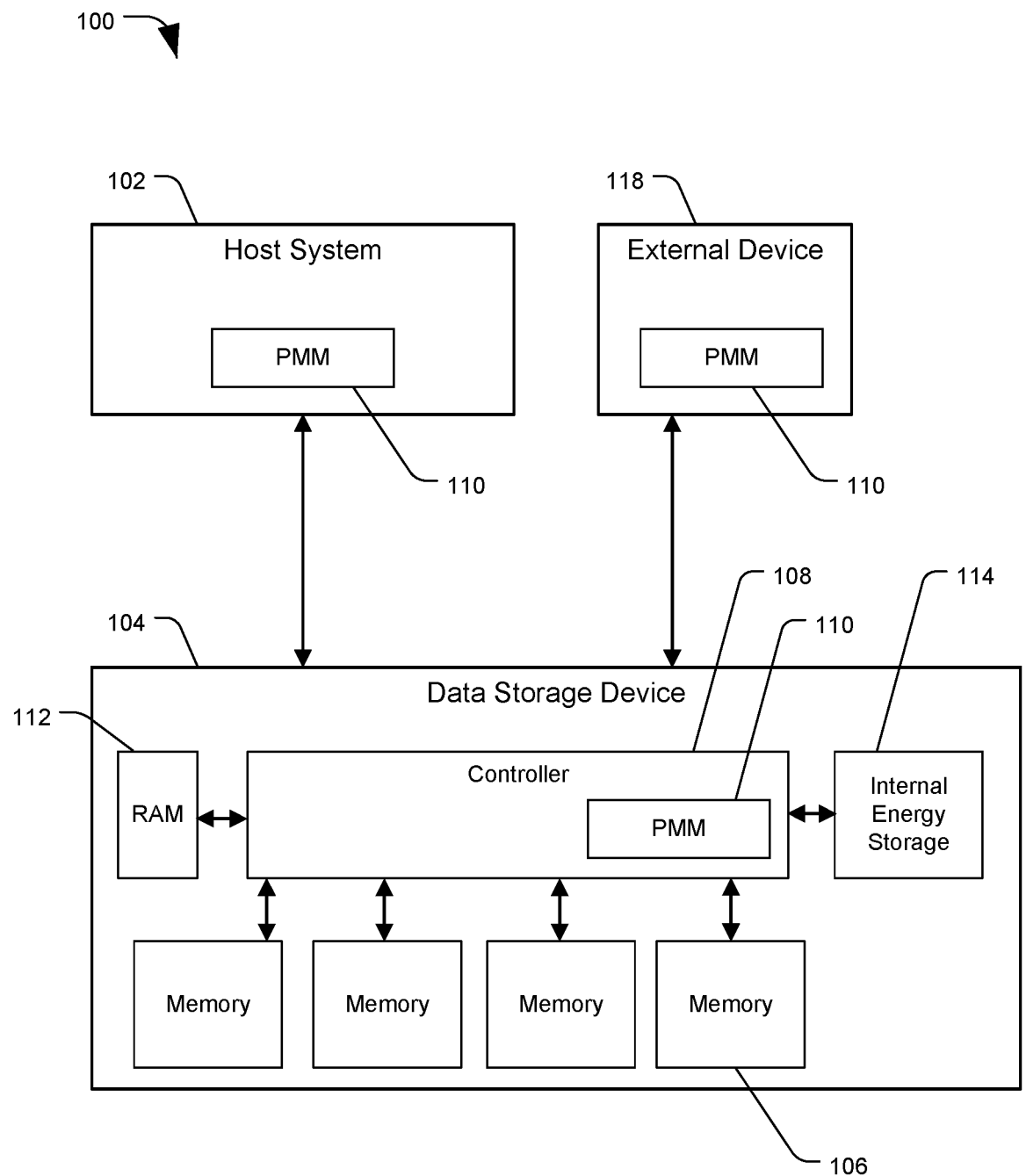
FIG. 1 is a diagram of a system configured for data storage performance scaling based on external energy, in accordance with certain embodiments of the present disclosure.

FIG. 1 is a diagram of a system configured for data storage performance scaling based on external energy, generally designated 100, in accordance with certain embodiments of the present disclosure. The system 100 may include a host 102, a data storage device (DSD) 104, and an external device 118. The host 102 may also be referred to as the host system or host computer. The host 102 can be a desktop computer, a laptop computer, a rack server, a tablet computer, a telephone, a music player, another electronic device, or any combination thereof. Similarly, the DSD 104 may be any of the above-listed devices, or any other device which may be used to store or retrieve data, such as a solid state drive (SSD). The external device 118 may similarly be any of the above listed devices, such as a hard disc drive (HDD), or may also be a dedicated device configured to store usable energy, such as a battery backup or capacitor.

The host 102, DSD 104, and external device 118 may be connected by any combination of wired or wireless connections, or by local area networks (LANs) or wide area networks (WANs). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include one or more nonvolatile memories 106, a controller circuit 108, a volatile working memory 112 such as RANI or DRAM, and an internal energy storage unit or component 114. During operation, the DSD 104 may receive a data access request, such as a read or write request, from the host device 102. In response, the DSD 104 may perform data access operations on the memory 106 using the controller 108 based on the request. The RAM 112 may be used as a cache to temporarily store host or user data pending storage to the bulk memory 106, or data recently read from the memory 106. The DSD 104 may accumulate write data from the host 102 in the RAM 112 so that the data can be efficiently organized or sorted, and encoded with error correction data prior to writing the data to the memory 106.

During normal power availability and operations, the DSD 104 may receive a steady energy supply from a power source, such as from being plugged into an electrical outlet, or from a host 102 to which the DSD 104 is connected. Normal power availability may refer to situations in which power is supplied to the DSD 104 from a primary energy source, such as from an outlet or a primary operating battery (e.g. a smartphone battery), and such power supply is not significantly limited enough in duration as to warrant immediate data-protecting storage and shut down procedures of the DSD. However, an unexpected power loss event may occur if the normal power supply is unexpectedly cut off, for example due to a regional power outage. Nonvolatile memories 106, such as NAND Flash dies, may be capable of retaining stored data even when power is removed. Conversely, volatile memory, such as RAM 112, may lose any data stored thereto when power is removed from the memory. If data in the RAM 112 has not yet been stored to a nonvolatile memory 106 when power is lost, that data may be completely lost and irrecoverable. Similarly, if power is lost in the middle of a write operation, the write operation may not be able to be completed and the partially-written data may be corrupted and irrecoverable. Further, in some types of memory, such as NAND flash, previously-written data may become corrupted during an incomplete write operation. Therefore, it may be important that all data writes pending at a storage device are fully completed to a nonvolatile memory to ensure reliability.

To address the risk of data loss due to unexpected power loss events, the DSD 104 may include an internal energy storage component 114. The internal energy storage 114 may be a battery or set of capacitors that can retain some amount of energy to use as backup power. As used herein, backup power or energy may refer to electrical charge that is held in reserve during normal power operations, and can be provided to the DSD 104 in the event of a power loss. If a power failure occurs, the energy stored in the internal storage 114 can be used to power the electronics long enough for the DSD 104 to store both user and internal management data (e.g. data mapping metadata), so that the state of the drive can be restored when power is restored. According, as used herein a normal power state or normal power operations may refer to conditions where the DSD 104 is receiving a steady and uninterrupted power supply sufficient to support continuous operation, as opposed to a power loss state in which the DSD 104 must operate on a limited supply of backup power to complete pending operations and shut down safely.

However, because internal energy storage components 114 such as capacitors can add significant cost to the DSD 104, they may often be sized to provide a minimal amount of energy. The DSD 104 may therefore be configured to limit its outstanding work in order to be able to recover from a power loss.

This limitation may be particularly noticeable when multiple write data streams are active from the host 102. For example, the nonvolatile memory express (NVMe) communication interface may allow data writes to be associated with a particular stream number or identifier, with all the data associated with a stream sharing some characteristic, such as an expected data retention time. Due to the limited backup energy available, the streams may be broken into sub-optimal data sizes. For example, data from multiple write commands associated with the same stream may be grouped into a parity stripe encoded with outer code error recovery data, and written across multiple memory die 106. It may be most efficient to write these as complete stripes once enough associated data has been received. Therefore each stream may have one or more data queues that get filled up over time. However, due to the number of potential streams and associated queues, and limited amount of backup or "holdup" energy in the internal storage 114 and resources at the controller 108, the stream data stripes may need to be broken into smaller inefficient sizes. These smaller sizes can create conflicts or with die accesses and other drive resources, such as requiring repeatedly swapping data in and out of buffers. It can be much more efficient to store an entire stripe of stream data and commit it to the media 106 as a single action, and then turn over the resources to another stream. Such improved performance efficiency may require more backup energy than is available in the internal energy storage 114.

Accordingly, the DSD 104 may include a power management module (PMM) 110. The PMM 110 may evaluate available backup energy, and adjust one or more performance metrics or characteristics applied by the DSD 104 during normal power operations based on the backup energy that will be available if an unexpected power loss occurs. The PMM 110 can consider backup energy available from sources external from the DSD 104 and in addition to or instead of the internal energy storage 114. For example, the PMM 110 may determine that backup energy may be available to the DSD 104 from the host 102, or from one or more external devices 118. Having access to additional backup energy from external sources may permit the PMM 110 to set the DSD 104 to an operating mode, e.g. via adjusting the performance metric, which provides more efficient, faster, or otherwise superior operating performance than operating in a mode where no additional external backup power is available.

For example, the internal energy storage 114 may provide sufficient energy to run the DSD 104 for ten milliseconds after normal power is lost. Ten milliseconds may be sufficient to complete, e.g. a currently executing host write operation and two additional queued host write operations, as well as storing related metadata or recovery data. If the internal energy storage 114 is the only available backup power, the DSD 104 may be limited to running in a base or lowest operating mode that can safely complete pending operations within 10 milliseconds. For example, this may include limiting a number of supported host streams, limiting data write sizes to the memory 106, aborting currently executing read operations, or other limitations. However, if the PMM 110 determines that additional backup energy is available from external sources such as host 102 or external device 118, which additional energy may be sufficient to operate the DSD 104 for 30 milliseconds after a power loss, the PMM 110 may adjust one or more performance metrics of the DSD 104 to provide more efficient operation. For example, more host streams may be supported, more host data may be stored to a volatile queue for efficient organization and command ordering, longer writes to the media 106 may be supported, pending read operations may be completed and returned to the host 102, or other operations may be adjusted. In some embodiments, the DSD 104 may support multiple performance settings based on different thresholds of available backup power.

Another example of an adjustable performance metric may include a manner in which the DSD 104 reports write completions to the host 102. The DSD 104 may only return write completion notifications to the host to report the successful completion of a write operation when it is known the write can be committed to nonvolatile memory even if power is lost. However, the DSD 104 may need to periodically delay host write operations to perform internal system operations, such as performing garbage collection operations, updating a nonvolatile copy of mapping data, reorganizing stored data, or other operations. To a host 102, these temporary write interruptions may appear as drops in the input/output operations per second (IOPS) for the DSD 104. This manner of IOPS irregularity or unreliability may create problems for certain host applications that expect or rely on a consistent IOPS rate. This issue, however, may be addressed with a DSD configured for improved performance based on external energy. With only internal energy reserves 114, the DSD 104 may have, e.g. 10 milliseconds of operating time after a power loss (holdup time). A garbage collection operation that prevents executing writes may consume most or all of that operating time, and so any buffered write operations awaiting the completion of the garbage collection may not be able to be completed, and therefore cannot be reported to the host. However, if the DSD 104 has 100 ms holdup time, the DSD 104 may know it can both complete the garbage collection and perform a number of writes after the garbage collection completes. Accordingly, when external energy is available, the DSD 104 may be able to continue reporting write completions for buffered write commands at some consistent rate or regular interval even during a write interruption due to internal operations, knowing that the DSD can "catch up" and complete the commands after the internal operations are completed. Rather than reactively reporting write completions as they happen, the DSD 104 can set a consistent and approximately regular write completion reporting "schedule" that will not be affected by internal write operation interruptions. For example, the DSD 104 may perform 20 writes in 40 ms, then perform 10 ms of internal operations, and then perform 5 more writes in 10 ms after the internal operations, for a total of 25 writes in 60 ms. The DSD 104 may report a write completion every 2.4 ms of the 60 ms, even during the interruption from the internal operations, if the DSD 104 knows it can complete the 5 writes after the internal operations based on the amount of external backup energy. To a host 102, the DSD 104 may appear to have a consistent and reliable IOPS rate, which may improve operations at the host 102.

As the PMM 110 may rely on information about available backup power from external devices, and a way to receive the power from the external devices, functionality of the PMM 110 may be distributed among or between devices. PMM 110 drivers or circuits may be installed at the host 102, the external device 118, or both, which may determine excess backup energy available at the host or external device, respectively. The external PMMs 110 may notify the DSD 104 of the available energy, either proactively or in response to an available energy query from the DSD 104. On a power loss, the PMM 110 may direct the backup power to the DSD 104.

For example, the host 102 or external device 118 may include a hard disc drive (HDD). An HDD can produce a significant amount of back electromotive force (EMF) when it spins down. On an abrupt power loss, this back EMF may be used to move the actuator to a safe location so the heads do not come in contact with the spinning platter. Once some of this energy is used to park the heads, and perhaps store data to a local flash memory, the rest of the back EMF energy may be unused and lost. If the DSD 104 were made aware of this potential energy and provide a means to receive it, the PMM 110 could increase the sizes of nonvolatile streaming data in order to write it more efficiently to the media 106. Backup power information may be conveyed from an external device 118 to the DSD 104 through a back channel such as an I2C bus, serial port, or other method, or from the host system 102 itself through a standard storage system interface such as NVMe, SATA (Serial Advanced Technology Attachment), SCSI (Small Computer System Interface), or SAS (Serial Attached SCSI).

As described herein, a host system 102 or other external device can include a PMM 110 and determine backup power that may be available to the DSD 104 in case of a power loss. An example system including a host and multiple connected devices is discussed in regard to FIG. 2

Figure 2:
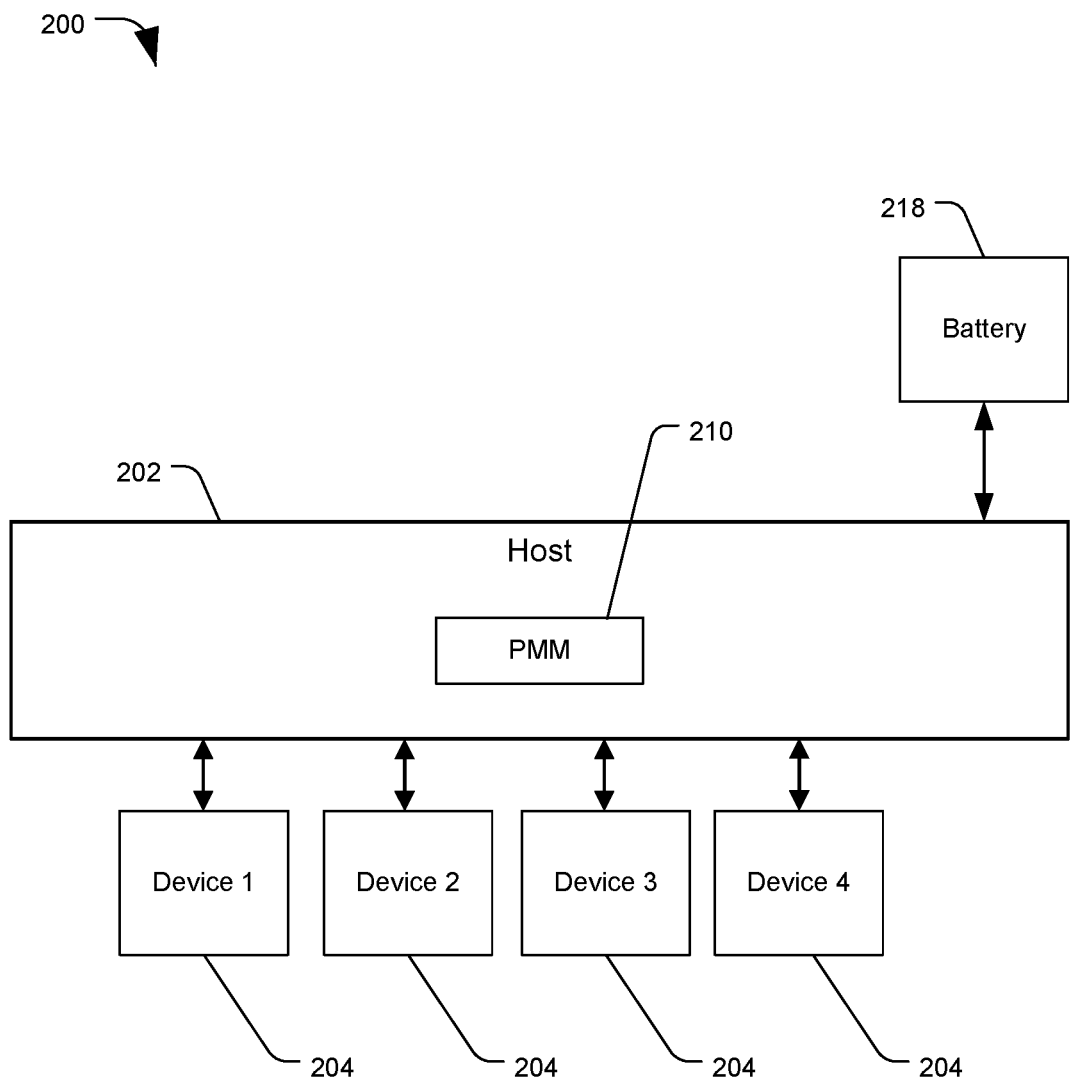
FIG. 2 is a diagram of a system configured for data storage performance scaling based on external energy, in accordance with certain embodiments of the present disclosure.

FIG. 2 is a diagram of a system configured for data storage performance scaling based on external energy, generally designated 200, in accordance with certain embodiments of the present disclosure. The system 200 may include a host 202 connected to a plurality of devices 204. The host 202 may correspond to the host 102 of FIG. 1, and the devices 204 may be any devices which may receive backup power from the host 202 in the event of an unexpected power loss, such as the DSD 104 of FIG. 1. For example, the host 202 may be a storage rack server performing data storage to a plurality of attached storage devices 204, including HDDs and SSDs.

As discussed herein, one or more of the devices 204 may be configured for performance scaling based on external stored energy. The devices 204 may rely on information provided by the host 202 to be aware of whether backup energy is available, and if so, how much. Accordingly, the host 202 may include a power management module (PMM) 210 to determine power resources available to share with connected devices 204, and to provide information to the shared devices 204 regarding available energy. For example, the host 202 may include internal batteries or capacitors, or one or more internal HDDs that may generate extra back EMF energy that may be shared with external devices 204. The host 202 may also be connected to external energy resources such as a backup battery 218, an external hard drive, or other potential energy sources, which may also include energy that may be shared with external devices 204 in the event of a power loss. The PMM 210 may query the battery 218 or other attached devices for backup energy available, or may receive notifications from the battery 218 or other devices notifying the host 202 of the available energy situation.

In an example embodiment, the host 202 may receive a normal steady power supply from a wall outlet or other persistent energy source. The devices 204 may receive normal power through the host 202. An external battery 218 may also receive power from the host 202 and charge to capacity during normal power operations. In the event that normal power is unexpectedly lost, the host 202 may include internal capacitors to permit the host 202 limited operational time to finish critical operations, or the host may switch over to drawing power from the external battery 218. For example, when a voltage meter within the host detects that the incoming power drops below a threshold value, the host may switch over to reserve or backup energy sources. The host 202 may send a notification to external devices 204 that normal power has been lost, so that the devices 204 can switch to a power-loss mode, such as by switching to internal capacitor energy and storing critical data. The backup energy sources available to the host 202 may include more energy than the host 202 needs to complete its own critical operations, and may therefore be shared with connected external devices 204. The PMM 210 may therefore, during normal power operations, determine an amount of available backup energy, and may calculate an amount the host requires for its own shut down operations. The amount available may fluctuate, for example depending on whether internal hard drives are spun up or not. Any amount of energy available above what the host 202 requires may therefore be available to provide to the external devices 204.

However, not all of the available energy can be provided to all the external devices 204; the energy may be a finite quantity that must be divided among the devices 204. In some embodiments, the PMM 210 may divide the available energy among the external devices equally, and may notify each device of a fractional 1/(number of external devices) amount of the total backup energy available. The PMM 210 may also be aware if some of the devices 204 are configured to perform performance scaling based on available external energy, while other devices 204 are not. The devices not configured to implement performance scaling may not be included in the energy distribution calculations.

The PMM 210 may also determine a backup power distribution among the devices 204 based on priority factors. For example, the host 202 may send various workloads to the devices 204, and may determine how much backup power to allocate to each device 204 based on the current or planned workload the host 202 sends to that device. For example, the host 202 may be sending or planning to send high-importance data writes to device 1, and may therefore allocate a greater portion of the backup energy to device 1 than to the other devices. Similarly, the host 202 may be sending a large volume of streaming writes to device 2, and may therefore prioritize device 2 for backup energy to ensure more efficient streaming write performance. In another embodiment, the host 202 may be sending a critical read operation to device 3 that the host wants to ensure is completed even in the event of a power loss, and may therefore distribute more energy to device 3. Other embodiments are also possible.

Figure 3:
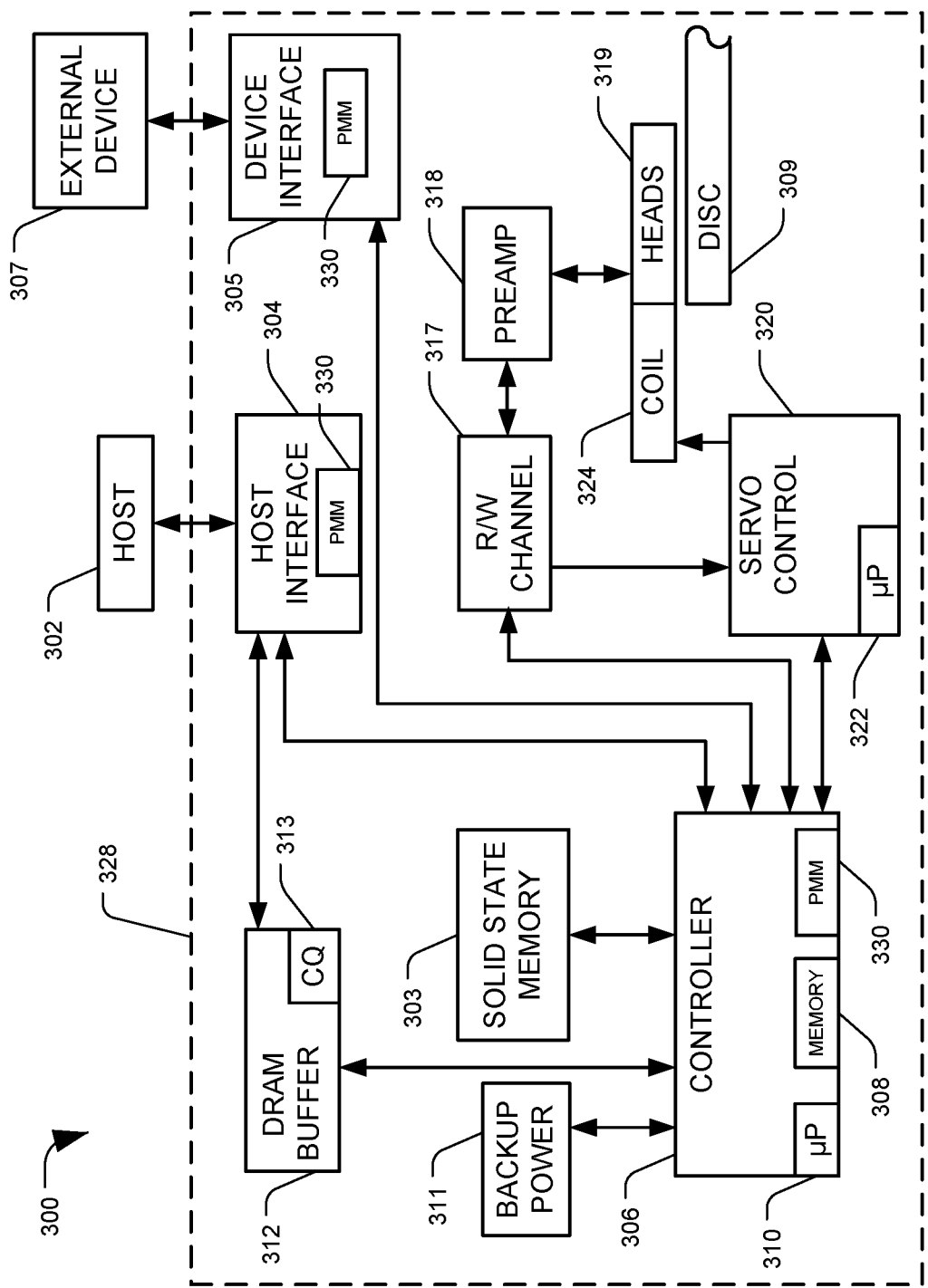
FIG. 3 is a diagram of a system configured for data storage performance scaling based on external energy, in accordance with certain embodiments of the present disclosure.

Turning now to FIG. 3, a diagram is shown of a system configured for data storage performance scaling based on external energy, generally designated 300, in accordance with certain embodiments of the present disclosure. Specifically, FIG. 3 provides a functional block diagram of an example data storage device (DSD) 300, which may be an embodiment of the data storage device 104 of FIG. 1.

The DSD 300 can communicate with a host device 302 via a hardware or firmware-based interface circuit 304. The DSD 300 may also communicate with one or more other external devices 307 through a device interface 305. The external devices 307 may be any device configured to provide backup power to the DSD 300 in the event of a power loss, such as a battery backup, an HDD, or other devices. The host interface 304 and device interface 305 may comprise any interface that allows communication and power exchange between devices and a DSD 300, such as USB, I²C, IEEE 1394, Compact Flash, SATA, eSATA, PATA, SCSI, SAS, PCIe, Fibre Channel, Ethernet, or Thunderbolt, among others. The host interface 304 and device interface 305 may include a connector (not shown) that allows the DSD 300 to be physically removed from the host 302 or external device 307. The DSD 300 may have a casing 328 housing the components of the DSD 300, or the components of the DSD 300 may be attached to the housing, or a combination thereof. The DSD 300 may communicate with the host 302 or external device 307, or receive backup power therefrom, through the host interface 304 or device interface 305, respectively. In some embodiments the DSD 300 may be connected to the host 302, the external device 307, or both, via more than one interface. For example, communication between devices may be via a first interface, and energy may be exchanged through a second interface.

The buffer 312 can temporarily store data during read and write operations, and can include a command queue (CQ) 313 where multiple pending operations can be temporarily stored pending execution. Commands arriving over the host interface 304 may automatically be received in the CQ 313 or may be stored there by controller 306, interface 304, or another component.

The DSD 300 can include a programmable controller 306, which can include associated memory 308 and processor 310. The controller 306 may control data access operations, such as reads and writes, to one or more memories, such as solid state memory 303 and disc memory 309. Solid state memory 303 can be either volatile memory such as DRAM or SRAM, or non-volatile memory, such as NAND Flash memory. The solid state memory 303 can function as a cache and store recently or frequently read or written data, or data likely to be read soon. Additional memory 303 may also function as main storage instead of or in addition to disc(s) 309. A DSD 300 containing multiple types of nonvolatile storage mediums, such as a disc(s) 309 and Flash 303, may be referred to as a hybrid storage device.

The DSD 300 can include one or more read-write (R/W) channel 317, which can encode data during write operations and reconstruct user data retrieved from a memory, such as disc(s) 309 or solid state memory 303, during read operations. For a disc 309 read channel, a preamplifier circuit (preamp) 318 can apply write currents to the heads 319 and provides pre-amplification of read-back signals. In some embodiments, the preamp 318 and heads 319 may be considered part of the R/W channel 317. A servo control circuit 320 may use servo data to provide the appropriate current to the coil 324, sometimes called a voice coil motor (VCM), to position the heads 319 over a desired area of the disc(s) 309. The controller 306 can communicate with a processor 322 to move the heads 319 to the desired locations on the disc(s) 309 during execution of various pending I/O commands in the command queue 313. If the disc(s) 309 are spinning when an unexpected power loss occurs, energy can be captured from back EMF of the discs as they spin down, which can be used to safely park the heads 319 away from the discs 309 to avoid damaging the media. Excess back EMF energy can be used to complete other operations at the DSD 300, such as completing writes to the solid state memory 303.

DSD 300 may include a power management module (PMM) 330, for example in the controller 306, the host interface 304, the device interface 305, distributed among multiple components, as one or more stand-alone circuits, or any combination thereof. The PMM 330 may perform the methods and processes described herein to determine available backup power available to the DSD 300 in the event of a power loss, and then adjust performance metrics of the DSD 300 during normal power operations based on the available backup power. The PMM 330 may determine an amount of internal backup power 311 available, for example from internal capacitors or spinning disc(s). If only internal backup power is available, the PMM 330 may set the DSD 300 to operate in a first performance state, such as a default operating state using a first, limited write-length operating mode. The PMM 330 may also query or receive notifications from the host 302 or other external device(s) 307 regarding available external backup power. Based on the amount of external backup power available, the PMM 330 may adjust performance metrics of the DSD 300. For example, the PMM 330 may compute a number of program operations to the solid state memory 303 that the DSD 300 may complete with the combined internal backup power 311 and external resources, and adjust a number of host write streams and the length of the striped data writes the DSD 300 can support. The performance metrics may be adjusted based on energy threshold values (e.g. a first performance setting at threshold 1, a second performance setting at threshold 2, etc.), or may adjust metrics more dynamically based on calculations of specific energy requirements for specific metric adjustments to optimize overall system performance based on the available backup energy. An example method of data storage performance scaling based on external energy is discussed in regard to FIG. 4.

Figure 4:
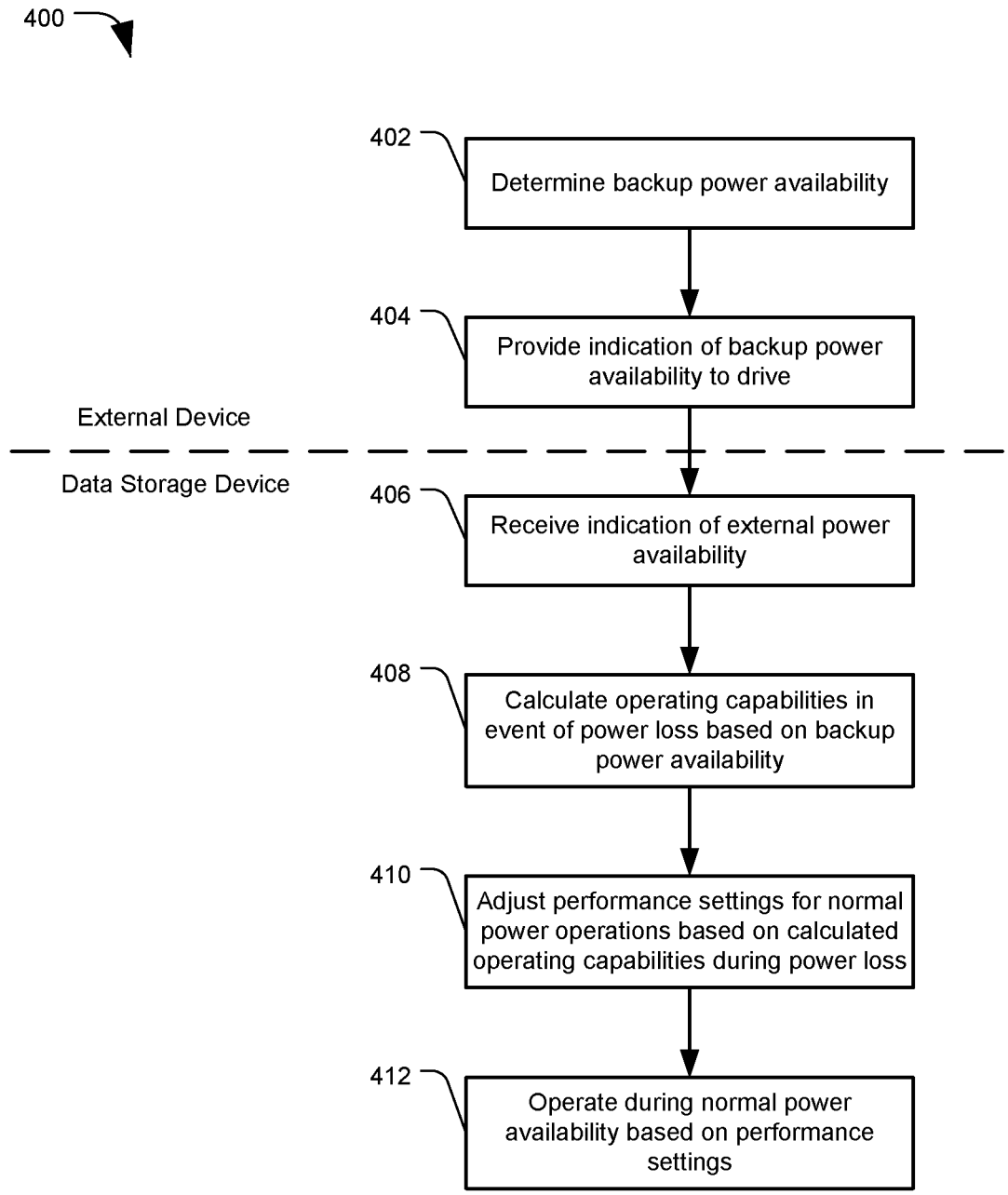
FIG. 4 is a flowchart of a method of data storage performance scaling based on external energy, in accordance with certain embodiments of the present disclosure.

FIG. 4 is a flowchart of a method of data storage performance scaling based on external energy, generally designated 400, in accordance with certain embodiments of the present disclosure. The method may be performed by a PMM of a DSD, such as PMM 110 of DSD 104 of FIG. 1, and by a device external to the DSD, such as external device 118 of FIG. 1.

The method 400 may include, at a device external to the DSD, determining backup power availability for sharing with the DSD in the event of an unexpected power loss at the DSD, at 402. For example, the external device may determine backup power availability in response to receiving a request from the DSD regarding power availability, or the external device may be configured (e.g. via drivers or firmware) to determine backup power availability without first being prompted. In some examples, an external device may determine an amount of backup power available to provide to the DSD when the external device powers on, and may continue to monitor for change. For example, if the external device is a hard disc drive, the amount of power available to provide to the DSD may change depending on whether the disc is spinning or not.

At 404, the external device may provide an indication of backup power availability to the DSD. Again, the indication may be provided to the DSD in response to a request from the DSD about backup power availability, or may be provided automatically at set intervals, when the power availability changes, or at other points. For example, the external device may be a host that determines how to distribute the available backup power among multiple attached DSDs. The host may notify the devices whenever the host adjusts the power allocation between the devices. Other embodiments are also possible.

At 406, the method 400 may include receiving the indication that signals external power availability to the DSD. At 408, the DSD may calculate its operating capabilities in event of a power loss based on the indicated backup power availability (which may include internally available backup power and backup power from multiple external devices). For example, the DSD may calculate an amount of write operations or other operations that may be completed based on the backup power, or how long the DSD may remain at full operating power. The calculations may consider operating with different performance metrics, such as determining a number of simultaneous data streams that may be supported, or an uninterrupted parity stripe write size that may be supported based on the available backup power.

The method 400 may include adjusting performance settings for normal power operations based on the calculated operating capabilities in the event of a power loss, at 410. Accordingly, if enough external backup power will be available during a power loss, the DSD may operate more efficiently even when a normal power supply is available, because the DSD may determine that it will be able to handle more efficient writes or streaming without data being lost in the event of a power loss. The DSD may then proceed to operate during normal power availability based on the selected performance settings, at 412. More specific details of certain embodiments of the method 400, as performed by the DSD or external device, are discussed in regard to FIG. 5 and FIG. 6, respectively.

Figure 5:
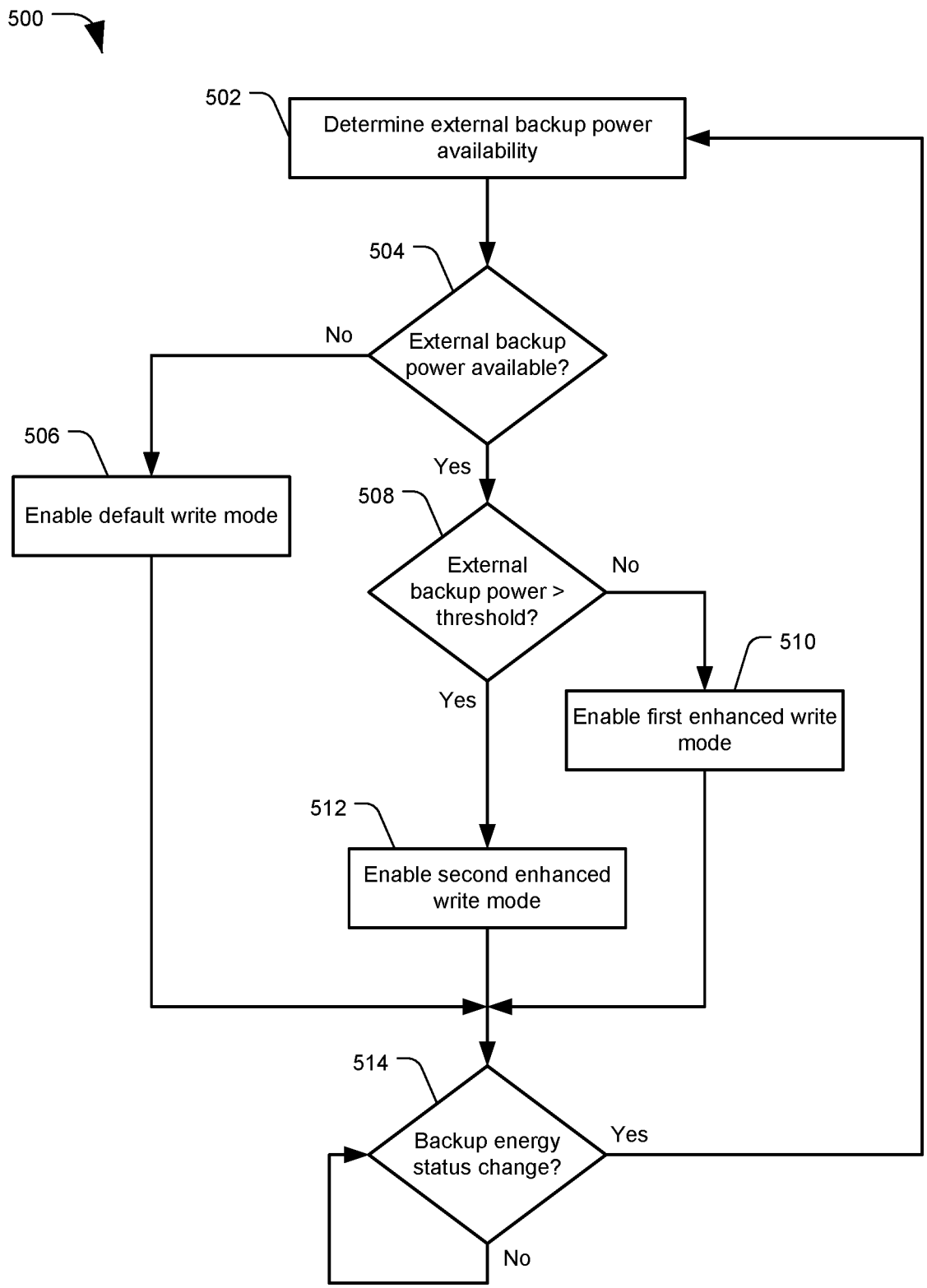
FIG. 5 is a flowchart of a method of data storage performance scaling based on external energy, in accordance with certain embodiments of the present disclosure.

FIG. 5 is a flowchart of a method of data storage performance scaling based on external energy, generally designated 400, in accordance with certain embodiments of the present disclosure. The method may be performed by a PMM of a DSD, such as PMM 110 of DSD 104 of FIG. 1.

At 502, the method 500 may include determining external backup power availability. The DSD may query external devices regarding available backup power in case of a power loss, or may receive notifications, indications, or updates on backup power from external devices without the need to send requests. Backup power availability information may be provided in the form of digital voltage levels, an amount of micro joules of stored energy, or any other quantization or indication of available power.

The method 500 may include determining whether external backup power will be available to the DSD in case of a power loss, at 504. If the DSD determines that no external backup power is available, for example based on a lack of information provided by external devices or by indications that no or insignificant power will be available, the DSD may enable a default write mode or operating mode, at 506. The default operational modes may be based on operating with the assumption that only internal backup power will be available in the event of a power loss, and may therefore provide minimum operational performance metrics. The DSD may support a base or minimal number of streams, or may perform short write operations and frequent write stream swapping to ensure no data is lost during a power loss event.

If a determination that external backup power is available, at 504, the method 500 may include determining whether the amount of external backup power is greater than a threshold amount, at 508. If not, the method 500 may include enabling a first enhanced write mode, at 510. The first enhanced write mode may include setting one or more performance metrics to a higher setting than in the default write mode.

An example performance metric may be a streamed data write size to the nonvolatile media, indicating an amount of data from a write stream that is written at one time. With more backup power the DSD may adjust operations to performing longer or more efficient streamed data stripe writes than in default mode. For example, a NAND flash memory device may be configured to perform writes in 32 kilobyte unit sizes, wherein every time 32 kb of host write data is accumulated it can be written to the media. However, data from different streams may be grouped together into longer chunks of data, such as a megabyte, which may be encoded with parity data and written in a parity stripe to the media. When more limited backup power is available, the DSD may write small portions of each parity stripe as the host data comes in for a corresponding stream, swapping between streams to prevent more host data being accumulated in volatile memory than can be stored within the backup power operational window. However, if more backup energy is available, the DSD may be able to accumulate longer or full streamed data stripes without swapping streams, and still be able to ensure that all host data accumulated for each stream can be encoded and stored to the nonvolatile memory.

If the external backup power is greater than the threshold, at 508, the method 500 may include enabling a second enhanced write mode, at 512. The second enhanced write mode may include setting one or more performance metrics to a higher setting than the first enhanced write mode. Although a single threshold determination is used in the depicted example, in some embodiments the method may include evaluating multiple thresholds and applying more than three write or operating modes. In another example, the method may include performing calculations based on the available external backup power to selectively configure operational settings, rather than applying pre-configured write modes in response to threshold comparisons. For example, the PMM may be able to access a table or database of an amount of power required for various operational settings, and may perform calculations based on the available external energy to optimize performance settings. Other implementations are also possible.

After selecting a write or operating mode and operating accordingly during normal power operations, at 506, 510, or 512, the method 500 may include determining if there has been any change in the backup energy status, at 514. The DSD may periodically request backup power availability from external devices, or may receive indications from external devices when the available backup energy changes. For example, an external HDD may have its disc spin down, reducing available power, or a host may increase streaming writes to the DSD and may therefore increase the DSD's portion of backup power available from the host. If there has been no change in the backup power availability status, the method 500 may include continuing to operate in the selected operating mode and monitoring for changes in available power. If there has been a change in the backup power status, at 514, the method 500 may include determining the new adjusted backup power availability at 502, and may accordingly adjust an operating mode or performance metrics of the DSD.

Turning now to FIG. 6, a flowchart of a method of data storage performance scaling based on external energy is shown and generally designated 600, in accordance with certain embodiments of the present disclosure. The method may be performed by a host connected to a plurality of devices configured for performance scaling based on available external energy, such as host 202 of FIG. 2.

Method 600 may include determining an amount of backup energy that will be available to provide to attached devices, at 602. The available backup energy may include energy from capacitors or batteries internal to the host device, or energy from other connected devices, such as external backup power supplies or hard disc drives. The amount of backup energy available to provide to attached devices in case of a power loss may include the total amount of backup energy available to the host, less any amount the host may require due to the power loss.

At 604, the method 600 may include determining priorities of data write commands or other workloads send from the host to the various attached devices. For example, the host may have two attached devices that can benefit from backup power, and the host may be sending high importance commands, or many streaming data write commands to device 1, and sending sporadic or low importance writes to device 2. The method 600 may include determining a backup energy distribution among the devices based on the determined data write workload priorities, at 606. In the provided example, the host may determine a distribution of 75% of the available backup energy may be reserved for device 1, and 25% of the backup energy may be reserved for device 2.

The method 600 may include notifying each device of the corresponding backup energy availability based on the determined energy distribution, at 608. The notification or indication may be sent from the host without prompting, or may be provided to a device in response to a backup power availability request. In the above example, the host may send a notification to device 1 that an amount of backup energy equal to (0.75\*available backup energy) is available, while the host may send a notification to device 2 that (0.25\*available backup energy) is available.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
 a data storage device having:
  an interface to communicate with an external device;
  a nonvolatile memory;
  a circuit configured to adjust performance during normal power availability based on an amount of power available from the external device in case of a power loss event where normal power availability is unexpectedly cut off, including:
   receive an indication, from the external device via the interface, of how much power will be available to the data storage device from the external device in case of the power loss event, based on a total amount of backup power available at the external device less an amount to perform any shutdown operations of the external device;
   adjust a performance metric of the data storage device to apply when accessing the nonvolatile memory during normal power availability based on the indication; and
   perform operations during normal power availability based on the performance metric.

2. The system of claim 1 further comprising:
 the performance metric includes a streamed data write size, indicating an amount of data from a write stream that is written at one time.

3. The system of claim 1 further comprising:
the nonvolatile memory includes a solid state memory; and
the external device includes a hard disc drive.

4. The system of claim 1 comprising the circuit further configured to:
calculate a number of data access operations to the nonvolatile memory that can be completed in the event of a power loss based on the indication; and
determine the performance metric to apply based on the number of data access operations.

5. The system of claim 1, the data storage device further comprising:
an internal energy storage unit to store internal backup power; and
the circuit further configured to:
adjust the performance metric based on a combined total available power after the power loss event, the combined total determined based on both the indication and an amount of the internal backup power.

6. The system of claim 1 comprising the circuit further configured to:
adjust the performance metric based on the indication, including:
apply a first operating mode having first performance characteristics when the indication signals that an amount of power available from the external device is below a threshold value; and
apply a second operating mode having second performance characteristics reliant on more power in the case of the power loss event than the first performance characteristics when the indication signals that the amount of power available is above the threshold value.

7. The system of claim 1 comprising the circuit further configured to:
monitor, during normal power operations, changes to the amount of power available from the external device in case of a power loss event; and
adjust the performance metric based on changes to the amount of power available from the external device.

8. The system of claim 1 further comprising:
the external device, including a host device connected to a plurality of devices including the data storage device, the host device configured to:
determine an amount of backup power available to provide to the plurality of devices in case of the power loss event;
determine priorities of workloads provided from the host device to the plurality of devices;
determine a backup power distribution among the plurality of devices based on the determined priorities of workloads; and
send the indication to the data storage device, the indication identifying an amount of backup power available to the data storage device based on the backup power distribution.

9. The system of claim 8 comprising the host device further configured to:
prioritize backup power distribution to devices from the plurality of devices to which the host device sends streaming data write commands, streaming data write commands including data write commands grouped according to a stream identifier.

10. The system of claim 8 comprising the host device further configured to:
determine the amount of backup power available, including determining power available from other devices connected to the host device.

11. A method comprising:
determining, at a host device, an amount of backup power available to provide to a plurality of devices connected to the host device in case of a power loss event, including a total amount of backup power available to the host device less an amount the host device requires to perform shutdown operations for the power loss event;
determining priorities of workloads provided from the host device to the plurality of devices;
determining a backup power distribution among the plurality of devices based on the determined priorities of workloads; and
sending an indication to at least one device from the plurality of devices, the indication identifying an amount of backup power available to the at least one device in the event of the power loss event based on the backup power distribution.

12. The method of claim 11 further comprising:
prioritizing backup power distribution to devices from the plurality of devices to which the host device sends streaming data write commands, streaming data write commands including data write commands grouped according to a stream identifier.

13. The method of claim 11 further comprising determining, at the host device, the amount of backup power available, including determining power available from other devices connected to the host device.

14. The method of claim 11 further comprising:
receiving, at a data storage device from the plurality of devices, the indication from the host device identifying the amount of backup power available to the data storage device;
adjusting, at the data storage device, a performance metric of the data storage device to apply when accessing a nonvolatile memory during normal power availability based on the indication; and
performing operations during normal power availability at the data storage device based on the performance metric.

15. The method of claim 14 further comprising:
adjusting, at the data storage device, the performance metric based on the indication, including:
applying a first operating mode having first performance characteristics when the indication signals that the amount of backup power from the host device is below a threshold value; and
applying a second operating mode having second performance characteristics when the indication signals that the amount of backup power is above the threshold value.

16. A method comprising:
adjusting performance of a data storage device during normal power availability based on an amount of power available from an external device in case of a power loss event where normal power availability is unexpectedly cut off, including:
receiving, at the data storage device, an indication from the external device of the amount of power available to the data storage device from the external device in case of the power loss event, based on a total amount of backup power available at the external device less an amount to perform any shutdown operations of the external device;

adjusting a performance metric of the data storage device to apply when accessing a nonvolatile memory during normal power availability based on the indication; and performing operations at the data storage device during normal power availability based on the performance metric.

17. The method of claim 16 further comprising:

calculating, at the data storage device, a number of data access operations to the nonvolatile memory that can be completed in the event of a power loss based on the indication; and determining the performance metric to apply based on the number of data access operations.

18. The method of claim 17 further comprising:

the performance metric to apply during normal power availability based on the indication includes returning write completion notifications from the data storage device to a host device for uncompleted buffered write operations at regular intervals during an interruption of write executions at the data storage device.

19. The method of claim 16 further comprising:

adjusting the performance metric based on the indication, including:

applying a first operating mode having first performance characteristics when the indication signals that the quantity of power available from the external device is below a threshold value; and applying a second operating mode having second performance characteristics when the indication signals that the quantity of power available is above the threshold value.

20. The method of claim 16 further comprising:

the external device includes a host device connected to a plurality of devices including the data storage device;

determining, at the host device, an amount of backup power available to provide to the plurality of devices in case of the power loss event;

determining, at the host device, priorities of workloads provided from the host device to the plurality of devices;

determining, at the host device, a backup power distribution among the plurality of devices based on the determined priorities of workloads; and sending the indication from the host device to the data storage device, the indication identifying an amount of backup power available to the data storage device based on the backup power distribution.

* * * * *